US005689442A

United States Patent [19]

Swanson et al.

[11] Patent Number: 5,689,442

[45] Date of Patent: Nov. 18, 1997

[54] EVENT SURVEILLANCE SYSTEM

[75] Inventors: Daniel R. Swanson, Dallas; Jerry M. Moen, Plano; Bradley M. Tate, Carrollton, all of Tex.

[73] Assignee: Witness Systems, Inc., Lubbock, Tex.

[21] Appl. No.: 408,901

[22] Filed: Mar. 22, 1995

[51] Int. Cl.[6] ........ G06F 17/40

[52] U.S. Cl. ........ 364/550; 340/500

[58] Field of Search ........ 340/500; 364/550, 364/551.01

[56] References Cited

U.S. PATENT DOCUMENTS

| | | | |
|---|---|---|---|
| 2,883,255 | 4/1959 | Anderson | 364/551.01 X |
| 3,349,679 | 10/1967 | Lohman, III | 95/11 |
| 3,689,695 | 9/1972 | Rosenfield et al. | 178/7.81 |
| 3,752,047 | 8/1973 | Gordon et al. | 95/11 |
| 4,214,266 | 7/1980 | Myers | 358/108 |
| 4,234,926 | 11/1980 | Wallace et al. | 364/551.01 |
| 4,277,804 | 7/1981 | Robison | 358/108 |
| 4,281,354 | 7/1981 | Conte | 360/5 |
| 4,511,886 | 4/1985 | Rodriguez | 340/534 |
| 4,745,564 | 5/1988 | Tennes et al. | 364/550 X |
| 4,843,463 | 6/1989 | Michetti | 358/108 |
| 4,910,591 | 3/1990 | Petrossian et al. | 358/103 |
| 4,922,339 | 5/1990 | Stout et al. | 348/143 |
| 4,949,186 | 8/1990 | Peterson | 358/335 |
| 4,992,943 | 2/1991 | McCracken | 364/424.04 |
| 5,027,104 | 6/1991 | Reid | 340/541 |
| 5,111,289 | 5/1992 | Lucas | 358/108 |
| 5,121,200 | 6/1992 | Choi | 358/103 |
| 5,144,661 | 9/1992 | Shamosh et al. | 380/9 |
| 5,155,474 | 10/1992 | Park et al. | 340/691 |
| 5,191,312 | 3/1993 | Altmann et al. | 340/441 |
| 5,282,182 | 1/1994 | Kreuzer et al. | 369/21 |
| 5,319,394 | 6/1994 | Dukek | 348/148 |
| 5,437,163 | 8/1995 | Jurewicz et al. | 62/126 |
| 5,549,115 | 8/1996 | Morgan et al. | 128/696 |
| 5,557,546 | 9/1996 | Fukai et al. | 364/551.01 |
| 5,557,548 | 9/1996 | Gover et al. | 364/551.01 |

OTHER PUBLICATIONS

Steve Ditlea, Real Men Don't Ask Directions, *Popular Science*, Mar. 1995, pp. 86, 87–89, 120, 121.

Dawn Stover, Radar On a Chip; 101 Uses In Your Life, *Popular Science*, Mar. 1995, pp. 107–110, 116, 117.

*Primary Examiner*—Edward R. Cosimano

*Attorney, Agent, or Firm*—Jenkens & Gilchrist, P.C.

[57] ABSTRACT

A surveillance system operable to capture images and sounds concerning events for storage in a random access data store. A data management functionality is provided to dynamically manage storage of information in the data store and thus emphasize retention in storage of information concerning those events identified as events of interest. No longer wanted information is deleted to make room in storage for subsequently captured information. The identification of an event as being "of interest" is made by a mode control functionality in response to the processing of signals received from an environment sensor monitoring conditions related to the events. The mode control functionality further controls the operation of the imaging and audio device used to capture images and sounds. The captured information is encrypted prior to storage to insure its integrity.

38 Claims, 5 Drawing Sheets

EVENT SURVEILLANCE SYSTEM

BACKGROUND OF THE INVENTION

1. Technical Field of the Invention

The present invention relates to surveillance systems and, in particular, to a surveillance system for capturing and storing information concerning events of interest for subsequent use in investigations and courtroom proceedings.

2. Description of Related Art

Human eyewitnesses to events often times provide the most important or only sources of evidence available to investigators and triers of fact in determining what actually occurred during an event of interest. Unfortunately, due in part to known frailties of human nature, the perceptions and recollections of multiple eyewitnesses to an event of interest tend to conflict with one another and, in fact, may also conflict with the physical evidence collected from the scene of the event. Eyewitnesses to events of interest have also been known to embellish or fabricate portions of their recollection of the event, with the unfortunate result of leading investigators and fact finders to incorrect conclusions. The factual accuracy of human eyewitness accounts is especially called into question when the event of interest occurred either unexpectedly or over a short period of time. Another concern with relying upon eyewitness accounts is that the witness to the event of interest may be unwilling or unable (perhaps due to injury or death) to assist investigators and to provide information helpful in reconstructing the event.

To address the foregoing concerns regarding the efficacy of relying on human eyewitness accounts in the investigation of events of interest, attention has been focused on the development of mechanical and electronic surveillance systems for witnessing and recording event information. One mechanical system installed within a vehicle senses changes in vehicle brake fluid pressure to automatically take a photograph at or near the time of an accident. Electronic surveillance systems have been used in homes and businesses to record events of interest on video tape, with the recorded images being useful in civil and criminal investigations. For example, stores commonly use surveillance systems to monitor both customers and employees, with the recorded information being useful in investigating robberies, thefts, and claims of negligence (e.g., slip and fall claims).

Electronic video surveillance systems commonly record information with recorders and video cassettes having an endless loop of tape. With such a recorder and media, "older" recorded information is overwritten and thus erased by "newer" recorded information until recordation is either manually or automatically terminated in response to the occurrence of an event of interest. If the occurrence of an event is not timely recognized and the recordation of events terminated, then event information stored on the endless loop of tape is likely to be overwritten and lost. Conversely, if an event is incorrectly recognized as being "of interest", then recordation will be incorrectly and untimely terminated and the system will not record subsequently occurring events of interest.

An alternative to the use of endless loop of tape video cassettes is to instead use a conventional long playing tape and institute a procedure for periodically replacing and storing the tape. The use of such conventional tapes in video surveillance systems requires continuous attention on the part of the user to avoid situations where recordation of an event is missed because the tape runs out of space. Another drawback of such systems is that a significant amount of space must be provided for storing previously recorded tapes. Even with adequate tape storage space, there still exists a chance that a tape having a previously recorded event of interest will be inadvertently reused prior to discovery that the tape contained a recorded event of interest. In such a case, the previously recorded event information will be irretrievably lost.

Tape recorder based surveillance systems suffer from other known drawbacks as well. For example, due to their continued use, the mean time between failure of key components (like the tape head) is relatively short. The recorders further suffer from a drop-out problem where one or more frames of information are periodically lost. The recorders further do not provide for automatically indexing the recorded data which is helpful in retrieving data. Recorders also do not provide for automatically encrypting the data.

Some surveillance systems utilize more than one device to simultaneously obtain information on events. With such systems, it is imperative that some procedure or apparatus be used to correlate the information being obtained from the multiple sources. One common scheme of correlation records video information from multiple sources in a split-screen format. The drawback of split screen recording is a loss of resolution. Another solution to the information correlation problem is to utilize sophisticated camera systems having synchronization capabilities. While synchronized cameras solve the correlation problem and further allow recordation of information at full resolution, such cameras are extraordinarily expensive and thus are infrequently used.

In spite of the foregoing drawbacks, more and more video surveillance systems are being installed to record information useful in both civil and criminal investigations. The use of such information in investigations, especially criminal investigations, raises an additional concern that the recorded information may be tampered with prior to review. Accordingly, it is vitally important that the integrity of the evidence recorded by video surveillance systems be preserved. To address this concern, one prior art system provides a lockable or otherwise tamper-proof enclosure for holding the recording devices and thus preventing unauthorized access to the recording media. By restricting access to the recording device and documenting the chain of custody of the recorded media after it leaves the recording device, some degree of confidence in the integrity of the recorded information can be maintained.

Providing such physical protection for the recording device and procedures for handling of the media do not, however, guarantee the integrity of the information. Other prior art systems have overlaid a sound stripe on the recorded media to deter persons from attempting to alter the recorded information through deletion, replacement or rearrangement of video frames. This protection scheme is easily bypassed, however, by reproducing and re-recording the audio security stripe on the media after tampering.

SUMMARY OF THE INVENTION

The surveillance system of the present invention comprises an event sensor for capturing information (such as images and sounds) concerning events. The event sensor is connected to a control processor that controls both the acquisition of the information by the event sensor and the storage of the information in a data storage device. The event information acquired by the event sensor is encrypted prior to storage in order to insure integrity. An environment sensor connected to the control processor operates to monitor conditions in the environment. The control processor includes a mode control functionality which processes the sensed conditions to identify the occurrence of events of interest and, in response thereto, control operation of the event sensor to emphasize the capture for storage of information related to the detected event of interest. A data management functionality in the control processor dynamically manages the stored information by selectively accessing and deleting from memory previously stored information that is less important or less relevant to the identified events of interest than other previously recorded information.

BRIEF DESCRIPTION OF THE DRAWINGS

A more complete understanding of the surveillance system of the present invention may be had by reference to the following Detailed Description when taken in conjunction with the accompanying Drawings wherein.

DETAILED DESCRIPTION OF EMBODIMENTS

Figure 1:
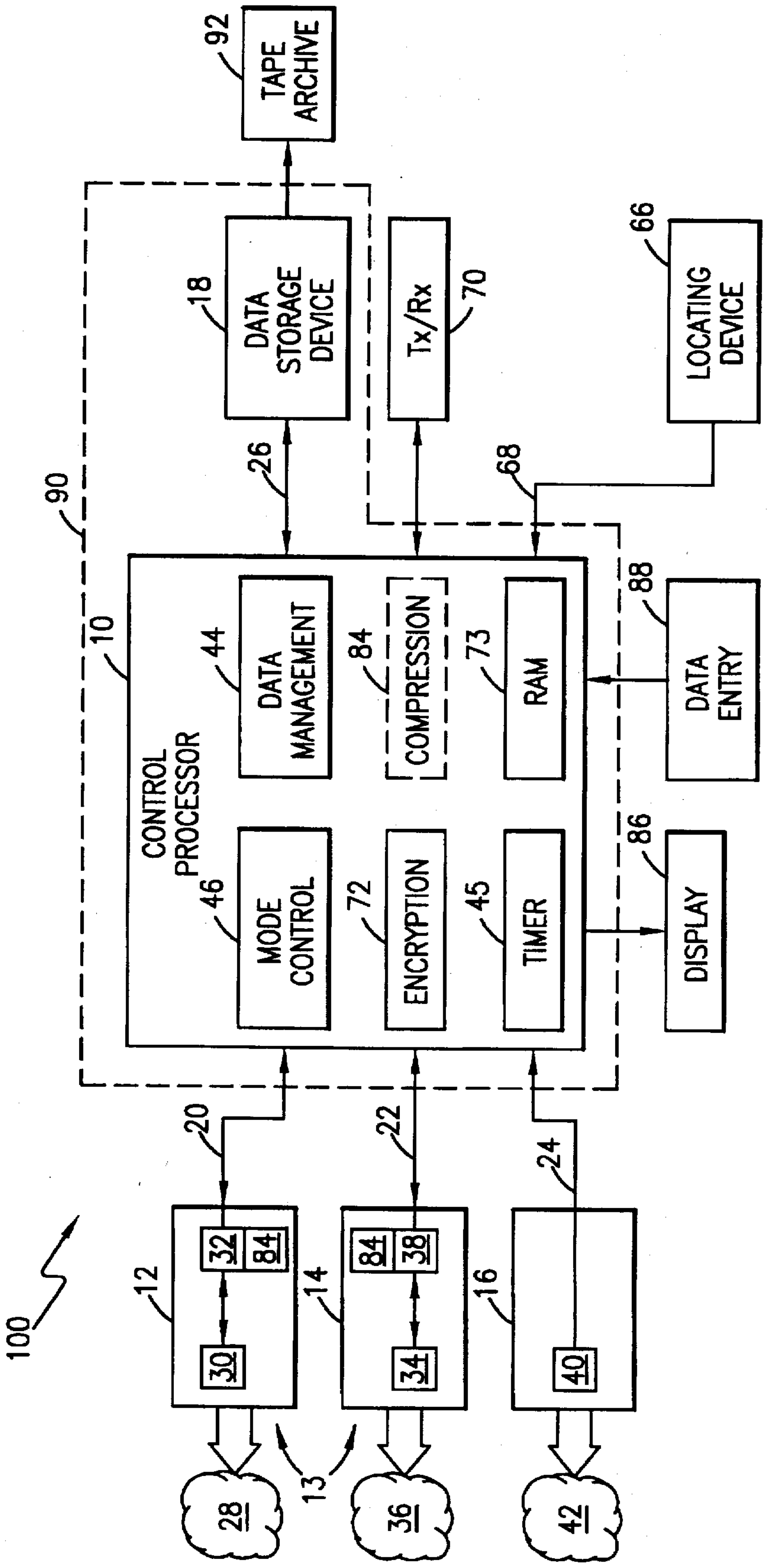
FIG. 1 is a block diagram of the surveillance system of the present invention.

Referring now to FIG. 1, there is shown a block diagram of the surveillance system 100 of the present invention. The surveillance system 100 comprises a control processor 10, an imaging sensor 12, an audio sensor 14, an environment sensor 16 and a data storage device 18. The control processor 10, comprising one or more distributed or parallel processing elements, is connected to the imaging sensor 12 via communications link 20, to the audio sensor 14 via communications link 22, to the environment sensor 16 via communications link 24, and to the data storage device 18 via communications link 26. The communications links 20, 22, 24 and 26 are bi-directional in nature comprising copper, fiber optic, infrared, radio frequency, or the like, type links in either a serial or parallel format.

The imaging sensor 12 and the audio sensor 14 comprise an event sensor 13 operating to capture video and audio information concerning events, with the acquired event information stored in the data storage device 18. All events that occur and which are observed or detected by the sensors 12 and 14 are not necessarily important events (i.e., events of interest). Accordingly, information previously captured by the event sensor concerning these events need not necessarily be retained in the data storage device 18. With respect to events of interest, however, as much information in as much detail as possible needs to acquired by the event sensor 13 and stored in the data storage device 18 for future use.

The imaging sensor 12 comprises at least one imaging device 30 like a CCD video camera, infrared camera or high resolution imaging radar for acquiring images 28 and outputting signals representing the same in either an analog or digital information format. It is preferred that more than one imaging device 30 be used for the imaging sensor 12 to facilitate the taking of images 28 from a plurality of different angles, distances and points of view. The imaging device(s) 30 in the imaging sensor 12 output information for processing by a remote processor 32. Operation of the imaging device(s) 30 is controlled by signals output from the remote processor 32 in response to commands received from the control processor 10. For example, image resolution, zoom, compression and frame rate of image capture are each controllable in response to signals received from the remote processor 32. It will, of course, be understood that the operation and performance of the imaging devices 30 in the acquisition of images 28 is controllable in a number of other well known ways.

The audio sensor 14 comprises at least one audio device 34 like a microphone for detecting sounds 36 (output in either an analog or digital information format) associated with the images 28 taken by the imaging sensor 12. It is preferred that more than one audio device 34 be used for the audio sensor 14 to facilitate recording of sounds 36 related to the images 28 from a plurality of different locations. Preferably, each imaging device 30 will have a corresponding audio device 34. Other audio devices 34 are also included, if desired, and positioned perhaps at locations that are not viewable using the imaging devices 30. The audio device(s) 34 in the audio sensor 14 output information for processing by a remote processor 38. Operation of the audio device(s) 34 is controlled by signals output from the remote processor 38 in response to commands received from the control processor 10. For example, gain, compression and filtering are each controllable in response to signals received from the remote processor 38. It will, of course, be understood that the operation and performance of the audio devices 34 in the acquisition of sounds 36 is controllable in a number of other well known ways.

Alternatively, the operative control exercised by remote processors 32 and 38 on the imaging device 30 and audio device 34, respectively, is effectuated directly by the control processor 10. In such a configuration, remote processors 32 and 38 are not included, and the control processor 10 is connected for the transmission of control commands directly to the imaging device(s) 30 and the audio device(s) 34. However, due to current limitations with respect to control processor 10 data processing and throughput capabilities, the distributed processing design scheme of FIG. 1 utilizing remote processors 32 and 38 is preferred.

The environment sensor 16 comprises at least one sensing device 40 for sensing event conditions 42 (output in either an analog or digital information format) related to the images 28 taken by the imaging sensor 12 and the sounds 36 detected by the audio sensor 14. Signals indicative of the sensing of such conditions 42 are output from the environment sensor 16 over line 24. The signals output from the environment sensor 16 concerning detected conditions are processed by the control processor 10 to determine whether the images 28 and sounds 36 acquired by the sensors 12 and 14 comprise an "event of interest" to the system 100 and should therefore be preserved to facilitate a future investigation of the event. The termination of an event of interest may also be detected by the sensors, or alternatively identified by the control processor 10 based on the expiration of a pre-set event time period.

The environment sensor 16, in general, comprises sensors of two different types. The first type of sensor comprises a passive sensor which merely monitors and reports on conditions in the environment. Conditions sensed by passive sensors include temperature, speed, motion, acceleration, voltage level, etc. The second type of sensor comprises an active sensor which emits energy and monitors the effects (for example, reflection) of such an energy emission to detect conditions. Examples of active sensors include radar and sonar systems useful in actively detecting the presence of objects. Other types of active sensing systems useful in surveillance systems are known to those skilled in the art. Depending on sensor type, the passive and active sensors will output analog, digital or intelligent (i.e., interface) signals for processing by the control processor 10.

It should also be recognized that the imaging sensor 12 and audio sensor 14 provide information on conditions 42 as well as output images 28 and sounds 36. The condition information output from the imaging and audio sensors is useful either in combination with the environment sensor 18 signals, or by itself, in identifying the occurrence of an event of interest. Thus, the control processor 10 further functions to monitor and process the images and sounds captured by the imaging sensor 12 and audio sensor 14 to detect conditions 42 indicative of the occurrence of an event of interest. Image recognition and sound recognition processes are implemented by the control processor 10 in detecting shapes, movements and sounds (including voice recognition) for purposes of identifying the occurrence of an event of interest. Alternatively, the sensors 12 and 14 may comprise intelligent devices capable of detecting the occurrence of an event of interest. It is the event, rather than the conditions 42, which are reported to the control processor 10. In such a case, the sensors 12 and 14 may respond to the event, and control their own operation, without receiving instructions from the control processor 20.

The characteristics of the information transmitted from the environmental sensor 16 to the control processor 10 are a function of the nature of the sensor(s) used in the environmental sensor 16. Accordingly, the control processor 10 is programmed to handle and make sense of the information received in the sensor signals output from different type of devices. For example, a sensor device may sense and output a signal indicative of a certain condition of interest to the system 100. In such a case, no further processing need be done on the signal prior to use in detecting the occurrence of and event of interest. An example of this is a temperature sensor whose output of the current temperature need not be further processed as the temperature level itself is often a condition of interest to the system 100. Other sensor devices may sense and output a signal indicative of a condition not necessarily of direct interest to the system, but which may be further processed by the control processor 10 to detect a condition that is of interest. An example of this may be a location or position detector wherein a series of position outputs can be processed by the control processor 10 to detect conditions of interest such as movement, velocity and acceleration.

A programmable mode control functionality 43 is provided in the control processor 10 for processing the signals output from the environment sensor 16 (and possibly the event sensor) to detect the occurrence of events of interest (as described above), and generating the commands directing the operation of the imaging and audio sensors 12 and 14, respectively, to capture information concerning the events. For example, with respect to the operation of imaging sensor 12, the mode control functionality 43 specifies operation in terms of resolution, frequency of capture (frame rate), zoom, pan and tilt, compression, etc. With respect to the operation of the audio sensor 14, the mode control functionality 43 specifies operation in terms of gain, compression, filtering, etc. In situations where sensors 12 and 14 are of the intelligent type, the control processor 10 either confirms or overrides sensor event detection and operation to capture event information.

Dynamic control over system 100 operation is effectuated by continued monitoring by the control processor 10 of the signals output from the environment sensor 16. In response to such continued monitoring and processing of sensor signals, the control processor 10 adjusts to changes in the environment to assure continued acquisition of event relevant images 28 and sounds 36. With such dynamic control over the mode of system operation, the system 100 is capable of directing the passive capture of event information concerning concurrently occurring events of interest. Detection of an event of interest by the mode control functionality 43 may further be used an active manner with the system 100, for example, signaling an alarm.

The control processor 10 further includes a data management functionality 44 for managing the storage in the data storage device 18 of sensor 12 and 14 acquired images 28 and sounds 36, as well as sensor 16 acquired conditions 42 relating to the images and sounds. The data management functionality 44 affects data storage by selecting frames of sensor 12 images 28 (and associated sounds 36 and conditions 42) for storage or for subsequent deletion from storage in the data storage device 18. This selection decision is based on an evaluation of a variety of factors including the mode of system 100 operation at the time of image and sound acquisition, the age or staleness of the acquired information, and the amount of space remaining in the data storage device 18. In this connection, it should be apparent that the data management functionality 44 will operate to preserve in storage those images, sounds and conditions that were acquired by the system 100 at or near the time of a detected event of interest. Images, sounds and conditions acquired at other times, and thus not as relevant to the detected event of interest, will be preserved in the data storage device 18 only until such time as the storage space occupied by the information is needed for the storage of subsequently acquired information. The operation of the data management functionality 44 is user selectable and programmable, and thus may be tailored to a particular application or need.

In order to keep track of when certain frames of images 28 and associated sounds 36 and conditions 42 are acquired, as well as to facilitate subsequent synchronization of information (especially if acquired by different sensors), the control processor 10 maintains a timer 45 and time stamps each frame of event information (76 in FIGS. 4A and 4B) comprising images, sounds and conditions prior to storage in the data storage device 18. By time stamping the event information output from the sensors 12, 14 and 16, the system 100 advantageously does not require use of sophisticated and expensive sensors having time synchronization capabilities. In instances where multiple systems 100 are positioned to monitor a single location, the timers 45 for each of the systems are synchronized.

Figure 2A:
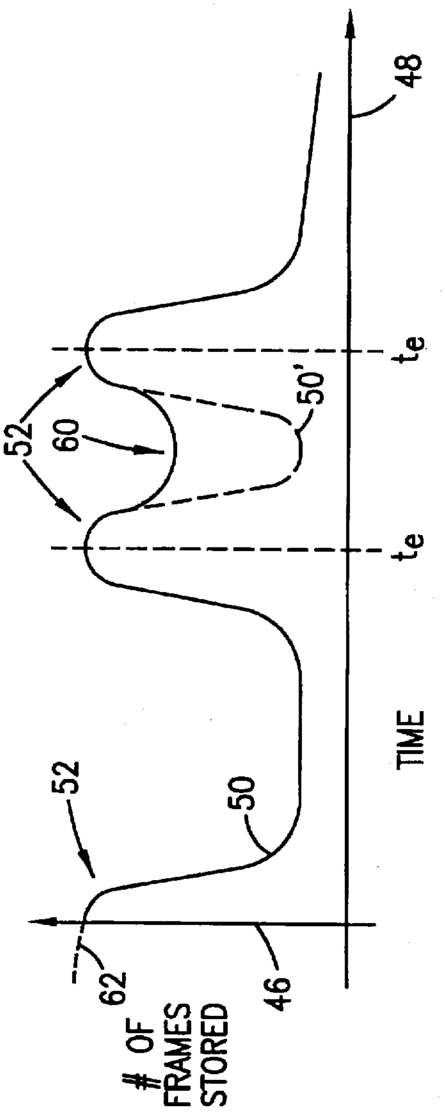
FIGS. 2A and 2B are graphs illustrating the amount of sensor information stored in relation to detected events of interest by the dynamic data management functionality of the system of the present invention.
Figure 2B:
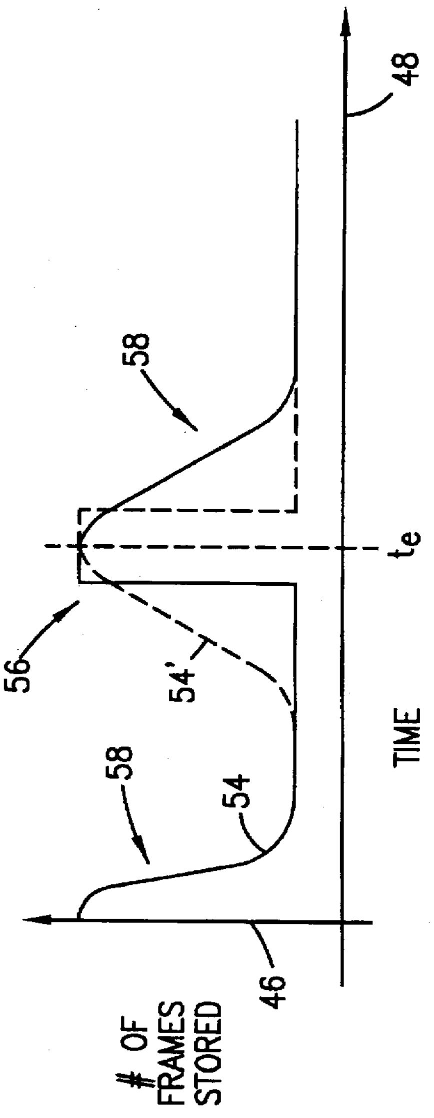

Reference is now made to FIGS. 2A and 2B wherein there are shown graphs illustrating examples of two methods of programming operation of the data management functionality 44 to emphasize the preservation of event information concerning detected events of interest. The y-axis 46 represents the number of frames of sensor 12 images 28 (and associated sounds 36 and conditions 42) stored by the data storage device 18. The x-axis 48 refers to the time at which the event information was acquired, with locations further right on the x-axis being "older" moments in time. The point on the x-axis 48 where the y-axis 46 intersects with the x-axis corresponds to the present time.

In FIG. 2A, line 50 illustrates one data management scheme emphasizing the storage and retention in storage of frames (as generally indicated at 52) of sensor 12 images 28 (and associated sounds 36 and conditions 42) acquired at or near the present time and times $t_e$ of events of interest. The number of frames stored drops off in a bell curve fashion as time moves in either direction along the x-axis 48 away from the times $t_e$ of the events of interest. Another data management scheme illustrated by line 54 in FIG. 2B does not emphasize the storage of event information immediately after the times $t_e$ of events of interest (as generally indicated at 56), but does emphasize the storage of increasing amounts of event information as time leads up to the present time and either leads up to (as generally indicated at 58) the times $t_e$ of the events of interest or alternatively leads away from the events of interest (as shown by broken line 54').

The operation of the data management functionality 44 to control the amount of information stored in the data storage device 18 is a constant, ongoing process, with the stored data being evaluated in terms of the detection of events of interest, the age or staleness of the acquired information, and the amount of space remaining in the data storage device 18. At the same time, however, the data management functionality 44 will prefer a management scheme where data is stored i.e., retained) rather than deleted. This is illustrated in line 50 of FIG. 2A at 60 where the data management functionality 44 is preserving a large number of frames of information acquired during the time between the two illustrated closely occurring events of interest $t_e$. However, due for example to a concern over dwindling amounts of available space for storing subsequently acquired event information, the data management functionality 44 will make room for soon to be acquired frames of information (as generally indicated by broken line 62) by deleting frames from storage (as illustrated by broken line 50') concerning event information acquired at times between the times of the two detected events of interest.

The management of stored data according to the functionality 44 thus comprises a dynamic, random access operation emphasizing the retention in storage of increased amounts of information acquired at or near the times of events of interest. The operation of such a data management functionality 44 accordingly requires that the control processor 10 be able to randomly access locations in the data storage device 18 to allow previously recorded frames of event information to be accessed and deleted when its retention is no longer needed. To facilitate the foregoing operations, the data storage device 18 must comprise some type of random access data store, like a PCMCIA card, that will allow the control processor 10 through its data management functionality 44 to selectively access locations in memory for data storage and data deletion. An alternative random access data store could comprise high memory content RAM chip(s) or extremely fast access disk drive(s).

Conventional magnetic tape cannot be used as the recording media in the data storage device 18 due to its inability to be quickly accessed in a random fashion by the control processor 10. However, a tape based data storage device is useful as an auxiliary data storage archive 92. Event information acquired by the sensors can be backed-up in the archive 92. Furthermore, in instances where the data management functionality 44 determines that more data needs to be stored than there is available space in the device 18, such overflow information (comprising "older" event information) may be transferred to the archive 92.

The random access data store for the storage device 18 thus will include a plurality of addresses (not shown) for storing frames of event information. These addresses will be accessed by the data management functionality 44 to store acquired frames of event information. After initial acquisition and storage, the data management functionality 44 operates as described above to dynamically manage the available data storage resources. In this connection, addresses in the data storage device 18 will be accessed by the data management functionality 44, and less valuable frames of event information stored therein will be deleted to make room for subsequently acquired information. The deletion determination is made to emphasize retention of the valuable event information relevant to detected events of interest. Accordingly, it is likely that adjacent addresses in the data storage device 18 will not contain related event information following the operation of the data management functionality 44 and the deletion of unwanted information.

The operation of the data management functionality 44 may be better understood through an example. At the present time, the system acquires frames of event information at a predetermined rate set by the mode control functionality 43. At or near the present time, all of the frames of event information will be stored at available addresses in the data storage device 18. However, if no event of interest is detected by the mode control functionality 43, the event information being collected becomes less and less important in terms of retention, and thus the data management functionality 44 will act to access the addresses of some of the previously stored frames and delete the information from storage. As time continues to pass, the data management functionality 44 will continue to delete more and more frames from storage to make room for newly acquired frames. Eventually, because no event of interest is detected near the time of information acquisition and storage, nearly all (if not all) of the previously acquired event information will be accessed and deleted by the data management functionality 44. Event information collected at or near the time of detected events of interest, on the other hand, will be retained to the greatest extent possible.

As mentioned above, a part of the event information stored by the system 100 comprises the information output from the environment sensor 16. This data is useful in a number of ways. First, the conditions 42 sensed by the environmental sensor 16 provide information that assists in the interpretation of images and sounds acquired by the sensors 12 and 14. For example, a captured image that reveals what appears to be liquid on a surface, in connection with a sensed condition 42 indicating a temperature below freezing, provides an indication that a slippery condition might have existed at the time of image was captured. Another use of the environmental information is in critically analyzing and trouble shooting system 100 performance, and in particular the performance of the mode control functionality 43 in identifying events of interest. Monitoring of environment conditions 42 that lead to an incorrect identification of an event of interest provide system analysts with information needed to adjust mode control functionality operation and performance to better and more accurately detect events of interest.

Figure 3:
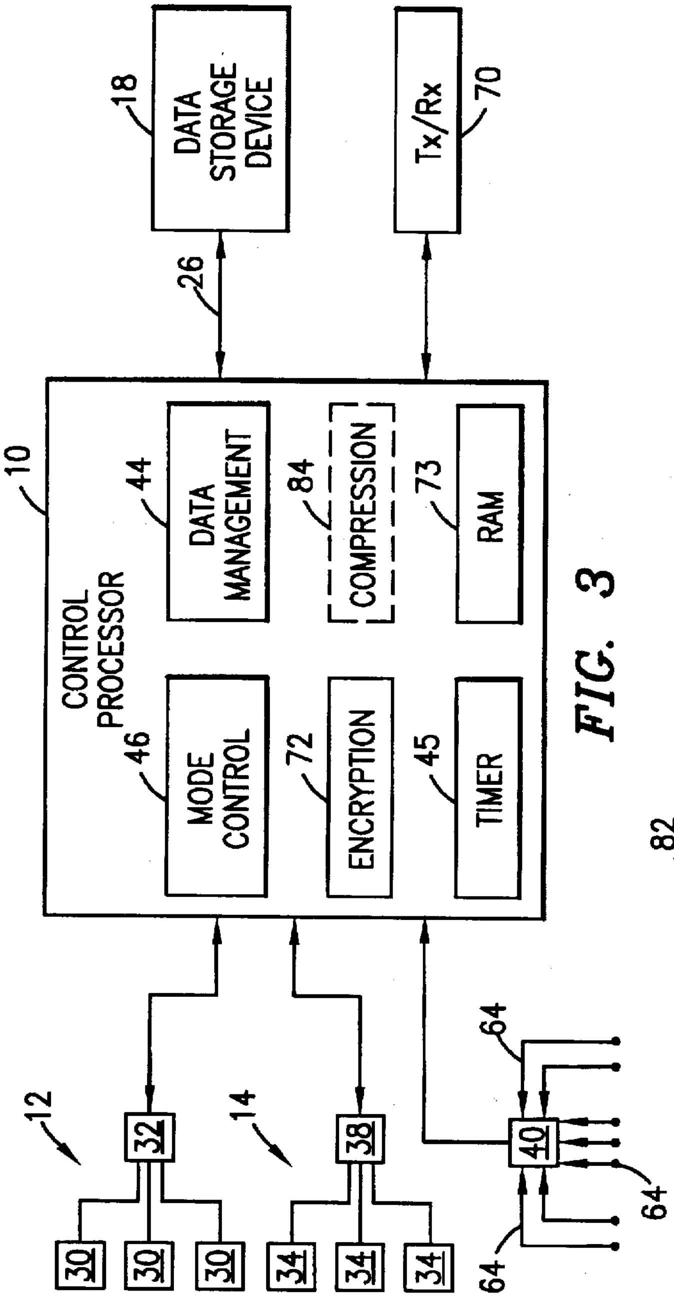
FIG. 3 is a block diagram of the surveillance system of FIG. 1 configured for enhancing security in a building.

A more complete understanding of the operation of the system 100 of the present invention may be had by reference to a specific example illustrated in FIG. 3 wherein the system is installed in a business for the purpose of enhancing building security. In such an installation, the imaging devices 30 of the imaging sensor 12 are positioned at number of different locations about the inside and outside of the building. Particular attention for placement of imaging devices would be directed to entrance and exit doors, secure or restricted access rooms or areas, and any other desired location. Audio devices 34 of the audio sensor 14 are located at image device locations, and further positioned in other areas of interest. The environment sensor 40 will include a number of sensor inputs 64 for receiving information regarding conditions 42 both within and without the building. For example, inputs 64 will be received from motion detectors, glass break sensors, door window sensors, card key readers, and smoke and fire detectors.

In operation, the images 28 and sounds 36 acquired by the sensors 12 and 14 will be recorded in the data storage device 18, with the stored event information dynamically managed in accordance with the data management functionality 44. The environment sensor 40 will monitor conditions inside and outside the building in an effort to detect the occurrence of an event of interest such as a fire, an attempted or actual break-in or other apparently unauthorized access. When signals indicative of the occurrence of such an event of interest are output to the control processor 10, the location of the event is determined and the mode control functionality 43 commands the sensors 12 and 14 to acquire images and sounds in the determined location with specified characteristics of acquisition. Such commands could, for example, increase the frame rate of the image devices and gain of the audio devices in the area of the determined location. Thus, in this particular scenario, more data from the devices 30 and 34 in the determined location than the devices in other locations will be transmitted to the control processor 10 and stored in the data storage device 18. An alarm may also be sounded. Concurrent to the handling of the event, the environment sensor 40 continues via inputs 64 to monitor conditions inside and outside the building. New events of interest may be concurrently or subsequently detected, with the mode control functionality 43 operating to dynamically adjust system 100 operation to emphasize the reception of images and sounds from devices 30 and 34 positioned at or near the location of the concurrently or subsequently detected event. The data management functionality 44 will continue to control information storage by deleting, but only if necessary (as described above), images and sounds acquired either at times other than the times of events of interest, or by devices 30 and 34 not positioned at the determined locations of the detected events of interest.

The system 100 of the present invention is useful in moving as well as fixed platform installations. Such moving platforms comprise not only vehicles like automobiles, buses, trains, aircraft, and the like, but also human beings, like police officers or delivery men. In moving platform installations, it is important that the location of the platform as well as the sounds and images be recorded for subsequent review. Accordingly, with reference again to FIG. 1, the system 100 further includes a locating device 66 such as a GPS receiver and processor. The locating device 66 is connected to the control processor 10 via line 68. Signals indicative of detected location are output from the locating device 66, processed by the control processor 10 and the detected location stored, with a time stamp, in the data storage device 18 along with the frames of images and associated sounds and conditions acquired by the sensors 12, 14 and 16.

The system 100 of the present invention further includes a transceiver 70 for facilitating remote communications to and from the control processor 10. The transceiver 70 is useful for transmitting the images 28 and sounds 36 being acquired by the sensors 12 and 14. With the transceiver 70, not only the images and sounds of the event of interest may be transmitted to a remote location, but also the platform location data obtained by the locating device 66 and conditions detected by the environment sensor 16. The transceiver 70 may comprise a radio frequency transceiver, but it will be understood that other communication means such as a cellular phone system or an infrared communication system may be used to suit particular applications and system 100 needs. With a cellular phone connection, the system 100 further can implement well known automatic dialing procedures for contacting remote locations to report the occurrence of detected events of interest.

The transceiver 70 further allows the remote location to transmit commands to the control processor 10 for purposes of directing operation of the system 100. Such commands may, in fact, be used to override the operation of the mode control functionality 43 and direct the sensors 12 and 14 to acquire certain information deemed by the remote location to be of particular importance for real time review using a data transmission via the transceiver 70. At the same time, however, the system 100 will continue to store other images and sounds in the data storage device 18 for subsequent review after the event of interest is over. The transceiver 70 further facilitates the downloading from the remote location to the system 100 of programming upgrades and operation parameter changes.

By means of the transceiver 70, the remote location can command the downloading of recorded information from the data storage device 18 at predetermined times (for example, after a shift is completed). Alternatively, the system 100 could be commanded to download recorded data while the system is being used thereby freeing up memory in the data storage device 18 for storage of information concerning subsequent events of interest. Along the same lines, the data management functionality 44 may command such a download in situations where available space in the data storage device reaches a critically low level.

The system 100 of the present invention is particularly useful as an investigative tool recording images and sounds of events of interest for future review. The recorded images and sounds thus comprise important, if not the only pieces of evidence available to investigators or triers of fact in making a determination of what actually occurred. It is therefore vitally important that some measures be taken to preserve the integrity of the stored images and sounds.

Figure 4A:
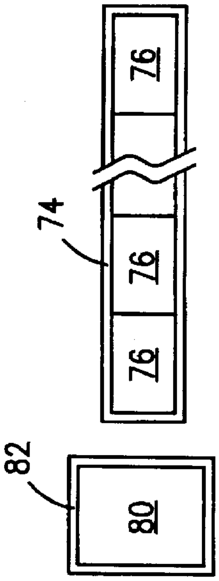
FIGS. 4A and 4B illustrate two methods for encrypting data.

The control processor 10 of the system 100 of the present invention accordingly further includes an encryption functionality 72 that operates to encrypt in some fashion either some or all of the information processed by the control processor 10 either for storage in the data storage device 18 or transmitted to a remote location by the transceiver 70. One method of encryption illustrated in FIG. 4A is to encrypt 74 in their entirety all of the frames of event information 76 (images, sounds and conditions). This method is especially useful when the information is to be transmitted to a remote location because anyone intercepting the transmission will be unable to access the information without the encryption key. Another method of encryption illustrated in FIG. 4B utilizes an encryption envelope 78 in front of or at the back of each frame of data 76 (such as the digital signature encryption currently used to protect electronic funds transfers). This method is especially useful when the information is being stored in the data storage device 18, and is not preferred for remotely transmitted data because the data can be reviewed without decrypting by anyone intercepting the transmission.

Figure 4B:
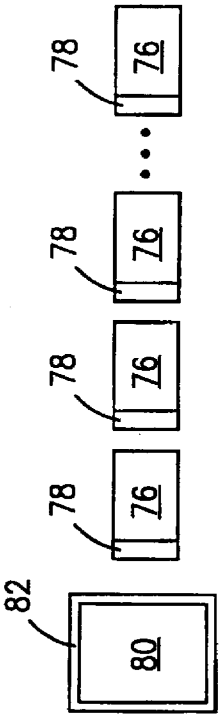

With either method illustrated in FIGS. 4A and 4B, the object of the encryption is to inhibit persons from tampering with the information and further allow for any attempted or completed acts of tampering to be detected. To provide a further measure of protection for stored information, the data management functionality 44 maintains an index 80 of the frames of event information 76 stored in the data stored device 18. Changes in the information stored in the data storage device 18 due to action of the data management functionality 44 cause a corresponding change in the contents of the index 80. For example, as old, no longer needed frames 76 are deleted, record of those frames is erased from the index 80. Similarly, as new frames 76 are stored, the index 80 is updated to reflect the presence of the new information. To prevent a person from deleting crucial frames 76 from the data storage device 18 and simply updating the index 80 accordingly to conceal the act of tampering, the index is also protected from tampering by encryption 82 in either format illustrated in FIGS. 4A and 4B. The updated index is primarily stored in RAM 73, and is periodically saved in the data storage device 18.

As a further measure of protection against tampering, the timer 45 (providing a record of current time) is capable of being reset only by means of a two-way communication with a remote location effectuated by means of the transceiver 70. A record of the time reset (or update) communication is maintained both at the remote location and in the control processor 10 RAM 73. These records are each encrypted using either of the formats illustrated in FIGS. 4A and 4B.

Reference is again made to FIG. 1. The amount of space available in the data storage device 18 is limited. Accordingly, as discussed above, the data management functionality 44 operates to dynamically control management of the available space and thus efficiently use the data storage device 18 to store as much event information as possible. Increased efficiency in data storage is provided by using a data compression functionality 84 to compress the event information prior to storage. Although shown located and preferably operated in the remote processors 32 and 38 of the sensors 12 and 14, it will, of course, be understood that the data compression functionality 84 is equally locatable in the control processor 10 (as shown). For images 28, either of the compression algorithms developed by the Joint Photographic Expert's Group (JPEG) or by the Moving Picture Expert's Group (MPEG) or any other suitable compression algorithm may be implemented to perform compression of the images acquired by the image sensor 12. Sounds 36, on the other hand, are compressed by the data compression functionality 84 using either the MPEG compression algorithm or other suitable compression algorithm.

The system 100 further includes a display 86, like a cathode ray tube, connected to the control processor 10 for displaying to a system user the event information currently being captured or previously stored. In fact, with the display 86 and random access data storage device 18, previously recorded event information may be viewed while the system 100 simultaneously records current event information. A data entry device 88 is provided connected to the control processor 10 to enable user selection of event information for display. Some control over system 100 operation may also be effectuated by the entry or selection of commands through the data entry device 88. The device 88 is further useful in entering data for storage in the data storage device 18, the entered data synchronized with the captured event information to which the input data relates.

To protect the control processor 10 and data storage device 18 from the environment and from tampering or other harm, these components are preferably installed in a temperature controlled enclosure 90. The enclosure 90 maintains a preset internal temperature range and further provides a physical barrier protecting against device damage or tampering. In particular, the enclosure 90 prevents unauthorized access to the data storage device 18 thus protecting the stored event information.

Figure 5:
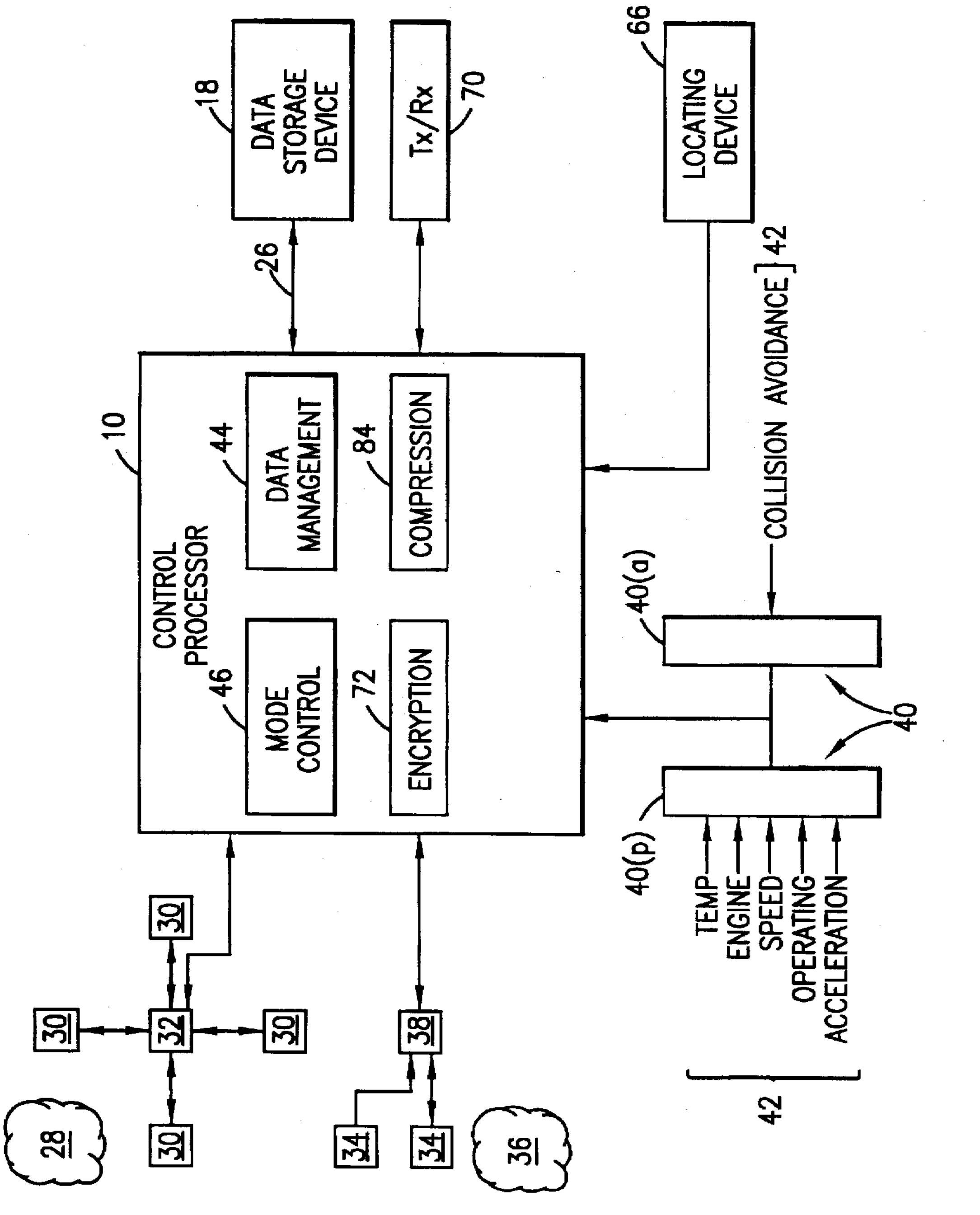
FIG. 5 is a block diagram of the surveillance system of FIG. 1 configured for mounting in a vehicle.

As mentioned above, the system 100 is particularly applicable for use in moving platforms. One implementation in a vehicle (like an automobile) is illustrated in FIG. 5. The vehicle installed system 100 preferably includes four imaging devices 30 oriented to image out each side and the front and back of the vehicle thus providing substantially three-hundred sixty degree external imaging coverage. Additional imaging devices 30 may be positioned inside the vehicle if desired. Audio devices 34 of the audio sensor 14 are located both inside and outside the vehicle, and further positioned at other locations as desired. The environment sensor 16 will include sensors 40 for detecting conditions 42 both inside and outside the vehicle. For example, the sensors 40 include: passive sensors 40(*p*) for sensing external temperature, engine conditions (RPMs, coolant temperature, oil pressure, etc.), vehicle speed, vehicle operating conditions (turn signals, headlights, horn, etc.), acceleration; and active sensors such as a radar collision avoidance system.

In the vehicle installation, the mode selected by the mode control functionality will emphasize the capture of event information based primarily on vehicle operation. For example, if the vehicle is moving in a forward direction, the emphasis will be placed on the acquisition of video information from the imaging devices with front and rear orientations. At the same time, the system 100 will monitor the detected conditions 42 in an attempt to identify a new event that would signal a mode change. Such a condition could comprise the slowing or stopping of the vehicle as the execution of a turn. These detected conditions may necessitate a mode change to acquire event information from other sources. A stopping of the vehicle could be caused by an accident or an approach to a stop sign. The mode control functionality processes the detected conditions 42 to identify which of these events is occurring and, in response thereto, acquire information concerning the former event only. The mode control functionality may further adjust the resolution of the imaging devices to acquire certain information of interest (such as a license plate number). From the foregoing, it will be understood that the mode control functionality 43 will separately control the operation of the devices in each of the sensors 12 and 14 in order to insure that only the most important and pertinent information is being obtained.

Figure 6:
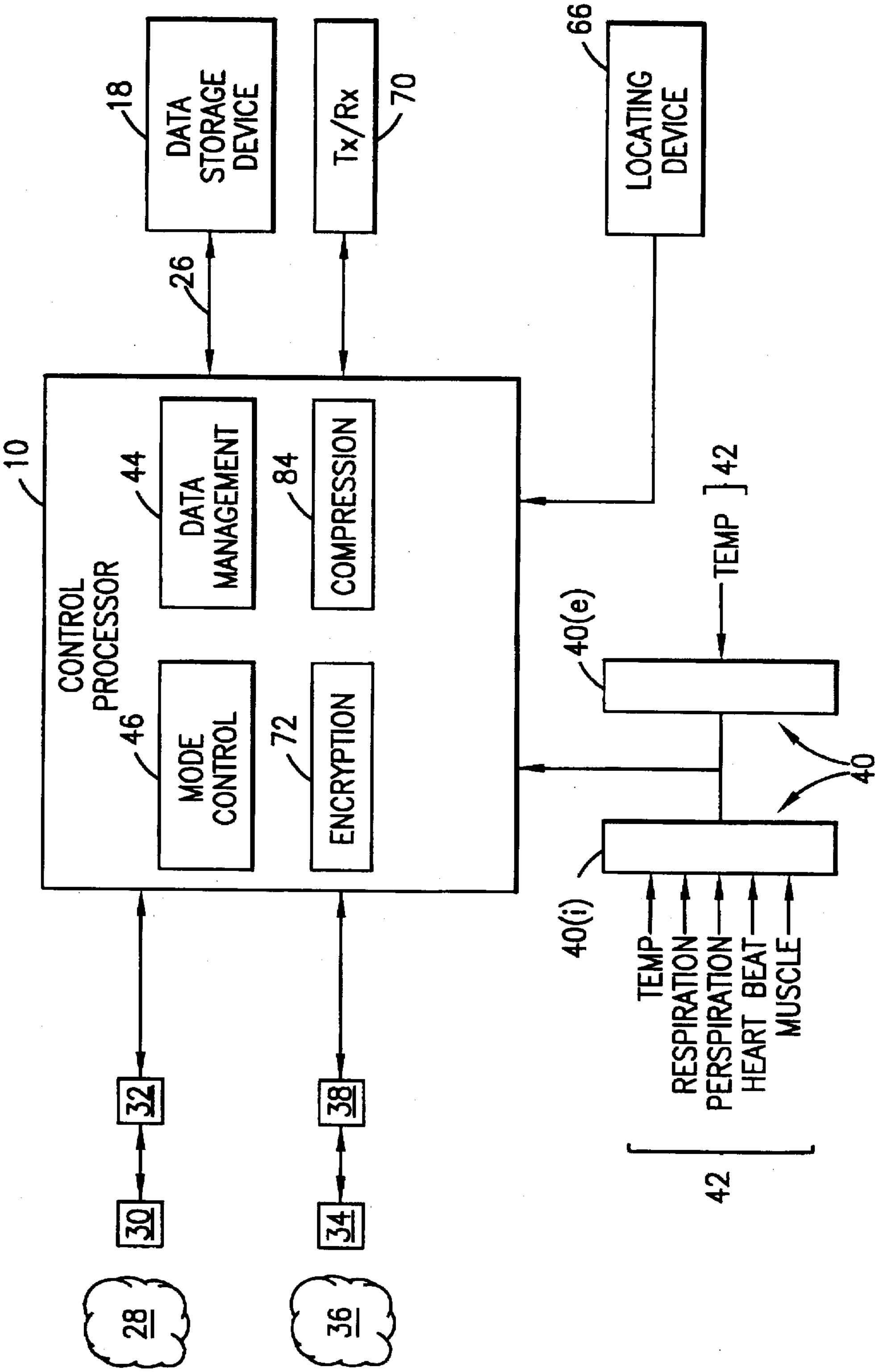
FIG. 6 is a block diagram of the surveillance system of FIG. 1 configured for carrying by a human being.

Use of the system 100 in a moving platform comprising a human being is illustrated in FIG. 6. The person carried installed system 100 preferably includes one device 30 oriented to image towards the front of the person. Additional imaging devices 30 may be positioned directed to the sides and behind the person if desired to provide three-hundred sixty degree imaging coverage. One audio device 34 is positioned on the body of the person to record the same sounds that the person hears. The environment sensor will include sensors 40 for detecting conditions both internal and external to the body of the person. For example, the sensors 40 include: internal sensors 40(*i*) for sensing body temperature, respiration, perspiration, heart beat, and muscle contractions; and external sensors 40(*e*) for sensing external temperature and location. The system 100 illustrated in FIG. 6 operates in the manner described above for the systems illustrated in FIGS. 1, 3 and 5. Accordingly, further detailed description of FIG. 6 and the operation of the system in the illustrated application is deemed unnecessary.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

We claim:

1. A surveillance system, comprising:
- an event information capturing device;
- a random access data store for storing event information captured by the event information capturing device; and
- a control processor connected to the event information capturing device and to the random access data store, the control processor responsive to an identification of the occurrence of events of interest, and including a data management functionality for dynamically managing the storage of captured event information in the random access data store by identifying, accessing and deleting from storage certain portions of the event information previously captured by the event information capturing device and stored in the random access data store that is not related to the identified events of interest in order to make room for the storage of subsequently captured event information.

2. The surveillance system as in claim 1 wherein the data management functionality further maintains an index of accessing locations in the random access data store for the stored captured event information.

3. The surveillance system as in claim 1 wherein the control processor further includes an encryption functionality for encrypting in entirety the event information captured by the event information capturing device to prevent access to the captured event information.

4. The surveillance system as in claim 1 wherein the control processor further includes an encryption functionality for encrypting an envelope around portions of the event information captured by the event information capturing device but not preventing access to the captured event information.

5. The surveillance system of claim 1 wherein the storage of captured event information and the deletion of the certain portions of the event information occurs substantially simultaneously.

6. The surveillance system as in claim 1, the control processor further including a mode control functionality for specifying a mode of operation for the system based in part upon the identification of events of interest.

7. The surveillance system as in claim 6, the control processor outputting, in response to its mode control functionality, commands for controlling operation of the event information capturing device to capture event information relating to identified events of interest.

8. The surveillance system of claim 6 wherein the mode of operation affects both the rate at which event information is captured and the amount of event information that is deleted by the data management functionality.

9. The surveillance system as in claim 6 further including an environmental sensor connected to the control processor for sensing conditions in the environment of the system and outputting sensor signals indicative of the sensed conditions to the central processing unit.

10. The surveillance system as in claim 9, the mode control functionality processing the sensor signals and, in response thereto, dynamically specifying the mode of operation of the system to capture event information relating to the sensed conditions.

11. The surveillance system as in claim 9 wherein the sensor signals output from the environmental sensor are stored in the random access data store.

12. The surveillance system as in claim 11, the data management functionality further dynamically managing the storage of sensor signals in the random access data store by identifying, accessing and deleting from storage certain portions of the sensor signals previously output from the environmental sensor and stored in the random access data store that is not related to the identified events of interest in order to make room for the storage of subsequently output sensor signals.

13. A surveillance system, comprising:
- event sensing means for capturing information concerning events;
- an environmental sensor for sensing event conditions and outputting sensor signals indicative of event occurrences;
- a storage device for storing the information captured by the event sensing means; and
- a control processor connected to the event sensing means, the environmental sensor and to the storage device, the control processor including a mode control functionality for processing the sensor signals to identify the occurrence of an event of interest and, in response thereto, dynamically select a mode of operation for controlling operation of the event sensing means to emphasize the capture of information concerning the event of interest for storage in the storage device.

14. The surveillance system as in claim 13 further including a transceiver for receiving commands from a remote location specifying the mode of operation for controlling operation of the event sensor.

15. The surveillance system as in claim 13 wherein the control processor further includes an encryption functionality for encrypting in entirety the information concerning events captured by the event sensing means to prevent access to the captured information concerning events.

16. The surveillance system as in claim 13 wherein the control processor further includes an encryption functionality for encrypting an envelope around portions of the information concerning events captured by the event sensing means to prevent access to the envelope around the captured information concerning events but not preventing review of the captured information concerning events.

17. The surveillance system of claim 13 wherein the mode of operation affects both the rate at which information concerning events is captured and the amount of information concerning events that is deleted by the data management functionality.

18. The surveillance system as in claim 13 wherein the event sensing means comprises an imaging sensor for capturing images of events, the control processor via its mode control functionality controlling operation of the imaging sensor to emphasize capture of images of events of interest.

19. The surveillance system as in claim 18 wherein the event sensing means further comprises an audio sensor for capturing sounds of events, the control processor via its mode control functionality controlling operation of the audio sensor to emphasize capture of sounds of events of interest.

20. The surveillance system as in claim 13 wherein the storage device comprises a random access data store, and the control processor further includes a data management functionality for dynamically managing the storage of captured event information in the random access data store by identifying, accessing and deleting from storage event information remotely related to events of interest in order to maintain sufficient available space in storage for the retention of captured information concerning identified events of interest.

21. The surveillance system of claim 20 wherein the storage of captured event information and the deletion of the certain portions of the event information occurs substantially simultaneously.

22. A surveillance system, comprising:

event sensing means for capturing information concerning events;

a storage device for storing the information captured by the event sensing means; and a control processor connected to the event sensing means and to the storage device, the control processor including an encryption functionality for encrypting the event information captured by the event sensing means prior to storage in the storage device.

23. The surveillance system as in claim 22 wherein the encryption functionality encrypts in entirety the event information captured by the event sensing means, said encryption preventing review of the event information itself.

24. The surveillance system as in claim 22 wherein the encryption functionality encrypts an envelope around portions of the event information captured by the event sensing means, said encryption not preventing review of the event information itself.

25. The surveillance system as in claim 22 further including a transceiver for transmitting, after encryption by the encryption functionality, the event information captured by the event sensing means to a remote location for decryption and review.

26. The surveillance system as in claim 22 wherein the storage device comprises a random access data store, and the control processor responsive to an identification of the occurrence of events of interest, and further including a data management functionality for dynamically managing the storage of captured and encrypted event information in the random access data store by identifying, accessing and deleting from storage certain event information that is not related to the identified events of interest in order to maintain sufficient available space in storage for the retention of subsequently acquired event information.

27. The surveillance system of claim 26 wherein the storage of captured event information and the deletion of the certain portions of the event information occurs substantially simultaneously.

28. A surveillance system, comprising:

a plurality of sensing devices for acquiring event information;

a storage device for storing acquired event information; and processing means connected to the sensing devices and the storage device including means responsive to the detection of an event of interest for controlling the operation of the sensing devices to acquire information concerning the event of interest and means for managing the storage and subsequent deletion of acquired event information to emphasize the retention in the storage device of event information concerning the detected event of interest.

29. The surveillance system of claim 28 wherein the sensing devices comprise imaging devices for acquiring images of events and audio devices for acquiring sounds of events.

30. The surveillance system of claim 28 wherein the sensing devices comprise environment sensors for acquiring information on conditions in the environment.

31. The surveillance system of claim 28 wherein the means for controlling further processes to condition information output by the environment sensors to detect the occurrence of an event of interest.

32. The surveillance system of claim 28 wherein the processing means further includes means for compressing event information prior to storage.

33. The surveillance system of claim 28 wherein the processing means further includes means for encrypting the event information prior to storage.

34. In a surveillance system operating to acquire frames of event information, a method for managing the storage of the acquired frames of event information in a random access data storage device having a plurality of storage addresses, comprising the steps of:

initially storing all frames of acquired event information at addresses in the random access data store;

monitoring for the detection of an event of interest;

accessing the addresses of those frames of previously acquired and stored event information not relevant to the detected event of interest; and deleting the accessed frames of event information from storage making the accessed addresses available for the storage of subsequently acquired frames of event information.

35. The method of claim 34 further including the steps of:

maintaining an index of the acquired event information and addresses of storage; and updating the index to account for the deletion of frames of event information not relevant to detected events of interest and the storage of subsequently acquired frames of event information.

36. The method of claim 34 wherein the step of accessing comprises the step of selecting increased numbers of frames of event information for deletion the more remote the time of acquisition to the time of the detected event of interest.

37. The method of claim 34 wherein the step of accessing comprises the step of emphasizing the retention in storage of those frames of event information relating to the detected event of interest.

38. The method of claim 34 wherein the steps of initially storing and of deleting occur at substantially the same time.

* * * * *